(12) United States Patent
Guo et al.

(10) Patent No.: US 7,526,075 B2
(45) Date of Patent: Apr. 28, 2009

(54) METHOD OF IMPLEMENTING ACCOUNT CHARGING AND ACCOUNT CHARGING SYSTEM

(75) Inventors: Xiaozheng Guo, Shenzhen (CN); Zhijian Lu, Shenzhen (CN); Xin Zhang, Shenzhen (CN); Qingchen Chu, Shenzhen (CN); Youkun Chen, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 88 days.

(21) Appl. No.: 10/566,952

(22) PCT Filed: Jul. 30, 2004
(Under 37 CFR 1.47)

(86) PCT No.: PCT/CN2004/000884

§ 371 (c)(1),
(2), (4) Date: Jan. 22, 2007

(87) PCT Pub. No.: WO2005/011194

PCT Pub. Date: Feb. 3, 2005

(65) Prior Publication Data

US 2007/0274481 A1    Nov. 29, 2007

(30) Foreign Application Priority Data

Jul. 31, 2003    (CN)    .............................. 03 1 44083

(51) Int. Cl.
H04M 15/00    (2006.01)

(52) U.S. Cl. ............. 379/114.03; 379/111; 379/114.01; 379/114.05; 379/114.12; 379/124

(58) Field of Classification Search ................. 379/111, 379/112.07, 114.01, 114.03, 114.05, 114.06, 379/114.1, 114.12, 115.01, 121.01, 121.02, 379/121.03, 121.04, 126, 127.05
See application file for complete search history.

(56) References Cited

U.S. PATENT DOCUMENTS

| 5,185,785 | A | * | 2/1993 | Funk et al. | ................... | 379/111 |
| 5,987,107 | A | * | 11/1999 | Brown | ................... | 379/114.12 |
| 6,011,837 | A | * | 1/2000 | Malik | ....................... | 379/114.1 |
| 2002/0068545 | A1 | * | 6/2002 | Oyama et al. | ............... | 455/406 |

(Continued)

FOREIGN PATENT DOCUMENTS

| CN | 1373586 | 10/2002 |
| CN | 1373586 A | 10/2002 |

OTHER PUBLICATIONS

International Search Report for PCT/CN2004/000884, dated Nov. 4, 2004.

*Primary Examiner*—Binh K Tieu
(74) *Attorney, Agent, or Firm*—Marshall, Gerstein & Borun LLP (57) ABSTRACT

A method for realizing charging includes setting up mapping relation between service attribute and charging rule acquiring service attribute of the to-be-charged service when it is demanded to charge the to-be-charged service acquiring charging rule of the to-be-charged service according to service attribute of the to-be-charged service, and charging the to-be-charged service according to the acquired charging rule. Also disclosed is a charging system having an acquiring charging rule module and charging processing module. When it is demanded to develop new services or modify charging rules of original services, it can be fulfilled by modifying the service information provided for charging processing module accordingly, thus charging requirements of various services can be satisfied. Charging processing module of charging system is independent of services, so that cost of charging system is reduced, and stability, reliability and versatility of charging system are improved.

11 Claims, 3 Drawing Sheets

U.S. PATENT DOCUMENTS

2004/0133487 A1* 7/2004 Hanagan et al. ............... 705/34
2006/0168303 A1* 7/2006 Oyama et al. ............... 709/231

* cited by examiner

FIG. 1

(Prior Art)

METHOD OF IMPLEMENTING ACCOUNT CHARGING AND ACCOUNT CHARGING SYSTEM

Cross References to Related Applications

This application is the national phase of International Application No. PCT/CN2004/000884, which was filed on Jul. 30, 2004, and which, in turn, claimed the benefit of Chinese Patent Application No. 03144083.5, which was filed Jul. 31, 2003, the entire disclosures of which are hereby incorporated by reference.

FIELD OF THE TECHNOLOGY

The present invention relates to the network communication technique field, more particularly to a method for realizing charging and charging system.

BACKGROUND OF THE INVENTION

With the fast development of computer techniques, the computer has become an indispensable tool in people's life and work. The Internet has also grown deeply into our lives with the development of computing technology. People can log online with a compute so as to communicate, entertain and work through the Internet. When people log online with a computer or dial IP telephone through Internet, charging becomes a very important job for the service providers who provide Internet services.

In the existing charging system, since the charging service properties of services are different, different charging rates are to be set for charging services of different service properties. The charging services are respectively processed by different charging processing modules, and all charging processing modules are combined to form a charging processing part.

Figure 1:
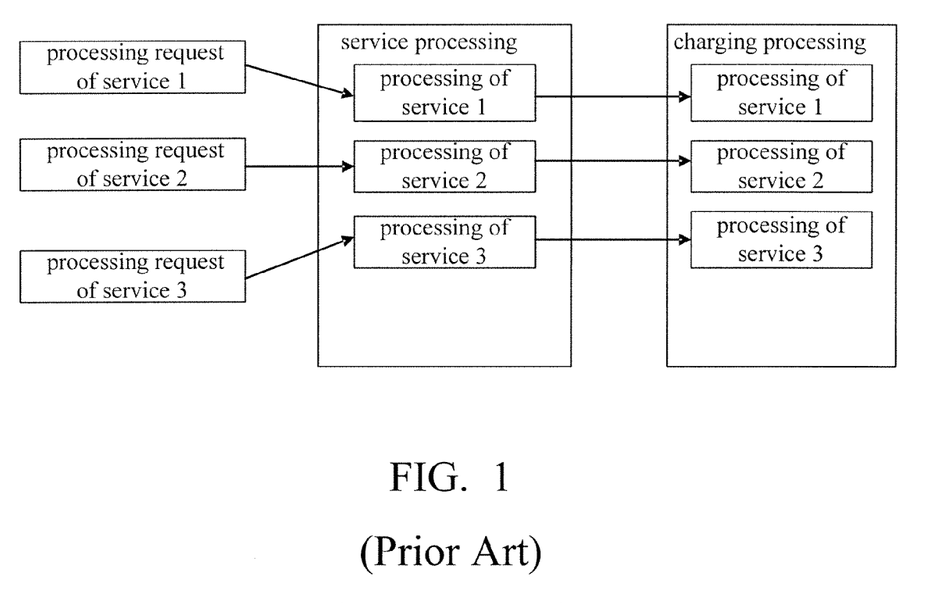
FIG. 1 is a schematic diagram illustrating the method for realizing charging in the prior art.

When the charging process of a service is needed, according to services with different service properties, different charging processing modules are invoked. As shown in FIG. 1, service 1 applies for charging, when charging process for service 1 is required, a necessary before-charging process is performed to service 1 by the service processing part. Then the charging processing module of service 1 is invoked by the charging process part to perform a charging process to service 1; in a similar manner, service 2 applies for charging. When the charging process for service 2 is required, a necessary before-charging process is performed to service 2 by the service processing part, then the charging processing module of service 2 is invoked by the charging process part to a perform charging process to service 2; in a similar manner, service 3 applies for charging, when charging process for service 3 is required, a necessary before-charging process is performed to service 3 by the service processing part, then the charging processing module of service 3 is invoked by the charging process part to perform a charging process to service 3.

Although the above-mentioned existing charging system can satisfy present services developed by the service providers, with people's requirement variety and fierce competition of economic marketing, in order to enhance the self competitive power, the service providers will put forward more charging rules or change the charging rules of existing services, so as to attract more clients to adopt the provided services, like changing the existing charging methods of IP telephone service. For example, the original IP telephone service is charged according to "calling number+called number", while the present IP telephone service is to be charged according to "calling number+called number+transfer number". When the service provider requires to put forward new services or change the existing charging rules of services, sometimes the existing charging system cannot satisfy the service provider's requests, specifically as follows:

In order to satisfy service provider's requests of developing new services or changing the existing charging rules of services, the charging system is needed to be updated. The work of updating the charging system is usually done by the developer, wherein the developer completes updating the existing charging system by modifying the existing charging processing part or adding new charging processing modules, but this updating may lead to the following defects:

(1) To update the existing charging system, the service provider needs to invest a great deal of human power, material resources and time, moreover, instable and insecure factors may be introduced to the whole charging system after the updating.

(2) In order to develop a system that can satisfy service provider's requests, after completing the charging system development, developer of the charging system has to test the system's robustness, namely, after completing the charging system development, to guarantee quality of the entire charging system, developer of the charging system has to perform activities like experimental testing, if error occurs in the charging system during experimental testing, the developer of the charging system needs to modify the system over again.

(3) After the final charging system is submitted to service provider by the developer of the charging system, the service provider has to make an acceptance testing of the charging system, and organize maintainers of the charging system for training.

Thus it can be seen, because of updating and modification to the existing charging system, the service provider is delayed to develop new services, even more, the service provider may be in a disadvantageous position in marketing competition due to the occasion delay.

To sum up, because the existing charging system is tightly coupled with services, the charging system is of high cost, poor stability and poor reliability, with a limited scope of application.

SUMMARY OF THE INVENTION

The present invention is to provide a method for realizing charging and a charging system based on the method of the present invention. When new services are to be developed or original charging method of service is to be modified, charging processing module is not needed to be adjusted, and only the service information that is provided for the charging system is to be modified. These make the charging system be independent of services so that cost of the charging system is decreased, and stability, reliability and versatility of the charging system are improved.

A method for realizing charging according to the present invention is provided, which comprises:

a. setting up a mapping relation between the service attribute of a to-be-charged service and the charging rule of the to-be-charged service, wherein said service attribute at least comprises a service identifier and a service charging type;

b. acquiring the service attribute of the to-be-charged service when the to-be-charged service is needed to be charged;

c. acquiring the charging rule of the to-be-charged service through the service attribute of the to-be-charged service, according to the mapping relation between the service attribute and the charging rule;

d. charging the to-be-charged service, according to the acquired charging rule of the to-be-charged service; and wherein the step a comprises:

a1. setting up a mapping relation among said service identifier, said service charging type and field name included in service charging attribute; a2. setting up a mapping relation between service charging attribute and said charging rule; and wherein the step c comprises:

c1. according to the mapping relation among said service identifier, said service charging type and field name included in service charging attribute, the field names included in service charging attribute of the to-be-charged service being acquired through service identifier and service charging type of the to-be-charged service;

c2. confirming service charging attribute of the to-be-charged service according to the field names included in the service charging attribute of the to-be-charged service, c3. according to the mapping relation between said service charging attribute and said charging rule, the charging rule of the to-be-charged service being acquired through said service charging attribute of the to-be-charged service.

Wherein the step a1 comprises:

a11. setting up a mapping relation among said service identifier, said service charging type and flag of selective service charging attribute;

a12. setting up a mapping relation between the flag of selective service charging attribute and said field names included in the service charging attribute.

Wherein the step c comprises:

c4. according to the mapping relation among said service identifier, said service charging type and said flag of selective service charging attribute, a flag of selective service charging attribute of the to-be-charged service being acquired through said service identifier and said service charging type of the to-be-charged service;

c5. according to the flag of selective service charging attribute of said to-be-charged service, the field names included in service charging attribute of said to-be-charged service being acquired;

c6. according to the mapping relation between the flag of selective service charging attribute and the field names included in service charging attribute, confirming service charging attribute of said to-be-charged service through the field names included in service charging attribute of said to-be-charged service;

c7. according to the mapping relation between said service charging attribute and said charging rule, the charging rule of the to-be-charged service being acquired through the service charging attribute of said to-be-charged service.

Wherein the step a11 comprises:

a111. setting up a mapping relation between said service identifier and a service charging category;

a112. setting up a mapping relation among said service charging category, service charging type and flag of selective service charging attribute.

Wherein said mapping relation between the service charging identifier and the service charging category comprises a mapping relation among said service identifier, service charging category and discount information;

wherein, the discount information comprises information of periodic discount and quantity discount.

Wherein said mapping relation among said service charging category, service charging type and a flag of selective service charging attribute comprises:

a mapping relation among said service charging category, service charging type, flag of selective service charging attribute, charging rule and subordinate charging rule;

wherein, said subordinate charging rule comprises a minimum session quantity charging policy and a session quantity rounding policy.

Wherein the table recording the mapping relation between said service charging attribute and charging rule is a sub-table of the table recording the mapping relation between said flag of selective service charging attribute and the field names included in said service charging attribute, and the two tables are correlated by service charging attribute identifier;

fields relating to said service charging attribute in the table recording the mapping relation between said service charging attribute and the charging rule are corresponding to fields relating to the field names included in said service charging attribute in the table recording the mapping relation between said flag of selective service charging attribute and the field names included in said service charging attribute.

Wherein field number of said table recording the mapping relation between said service charging attribute and charging rule and field number of the table recording the mapping relation between said flag of selective service charging attribute and the field names included in said service charging attribute are larger than that of any service charging attribute, respectively.

Wherein the method further comprises the step of:

when it needs to add more field names included in service charging attribute, column information are added to a corresponding record of the table recording the mapping relation between said service charging attribute and charging rule, as well as to a corresponding record of the table recording the mapping relation between said flag of selective service charging attribute and the field names included in said service charging attribute.

Wherein the step c comprises:

c8. acquiring service charging category and discount of said to-be-charged service through the service identifier of said to-be-charged service, according to the mapping relation between said service identifier and service charging category;

c9. determining whether the service charging attribute being needed to be acquired by judging whether the mapping relation among service charging category, service charging type and flag of selective service charging attribute comprise the charging rule that is corresponding to the service charging category and service charging type of the to-be-charged service, and, if yes, executing step c91, otherwise executing c95;

c91. according to the mapping relation among said service charging category, service charging type and flag of selective service charging attribute, acquiring the flag of selective service charging attribute and the subordinate charging rule that are corresponding to said service charging category and service charging type;

c92. according to the flag of selective service charging attribute of the to-be-charged service, acquiring the field name of said service charging attribute of said to-be-charged service;

c93. according to the field names of said service charging attribute of the to-be-charged service, acquiring the service charging attribute of the to-be-charged service;

c94. according to said service charging attribute of the to-be-charged service, acquiring the charging rule of the to-be-charged service;

c95. acquiring the charging rule and subordinate charging rule that are corresponding to the service charging category and the service charging type.

Wherein the step d comprises:

charging the to-be-charged service according to the charging rule, discount information and subordinate charging rule.

A charging system based on the above-mentioned method realizing charging, comprising:

a module for acquiring charging rule and a charging processing module, wherein the module for acquiring charging rule acquires the charging rule corresponding to the service to be charge according to service attribute of the to-be-charged service, and transmits the charging rule to the charging processing module;

the charging processing module charges the to-be-charged service according to the transmitted charging rule.

Wherein the module for acquiring charging rule comprises:

a sub-module for acquiring service charging category, a judging sub-module, a sub-module for acquiring service charging attribute, and a sub-module for acquiring service charging rule; wherein, the sub-module for acquiring service charging category is used to acquire the discount and service charging category which are corresponding to the to-be-charged service according to service identifier of the service attribute of the to-be-charged service, and outputs the discount to the charging processing module, and outputs the service charging category to the judging sub-module;

according to the received service charging category, the judging sub-module determines whether a service charging attribute is needed to be acquired by judging whether the mapping relation among said service charging category, service charging type and flag of the selective service charging attribute comprises the charging rule that is corresponding to the to-be-charged service; if no, the judging sub-module notifies the sub-module for acquiring service charging rule not to acquire the service charging attribute of the to-be-charged service; if yes, the judging sub-module notifies the sub-module for acquiring service charging attribute to acquire the service charging attribute of the to-be-charged service;

when the sub-module for acquiring service charging attribute receives the notification of acquiring the service charging attribute of the to-be-charged service, according to the mapping relation among the service charging category, service charging type and flag of selective service charging attribute, it acquires the flag of selective service charging attribute and the subordinate charging rule which are corresponding to the to-be-charged service; the sub-module for acquiring service charging attribute acquires the field name included in service charging attribute according to the flag of selective service charging attribute, and acquires the service charging attribute according to the field name included in service charging attribute, and transmits the subordinate charging rule to the charging processing module; transmitting service charging attribute to acquiring service charging rule sub-module;

when the sub-module for acquiring service charging rule receives the notification of not acquiring service charging attribute of the to-be-charged service, according to the mapping relation among the charging category, service charging type and flag of selective service charging attribute, it acquires the charging rule corresponding to the to-be-charged service and transmits the acquired charging rule to the charging processing module; when the sub-module for acquiring service charging rule receives the service charging attribute, it acquires the charging rule from the mapping relation between the service charging attribute and charging rule, and transmits the acquired charging rule to the charging processing module.

By applying the present invention, when new services are to be developed or original service charging method is to be modified, there is no need to update the charging processing module, which is center of the charging system. Charging requirements of various services can be satisfied by just modifying the service information provided for the charging processing module correspondingly; the charging processing module of the charging system is independent of charging method for developing new services or modifying original services, so that charging requirements of the existing various services as well as various services to be developed in the future can be satisfied by utilizing one set of charging processing module, which can reduce instable factors and insecure factors in the charging system, and therefore reduce cost of the charging system, enhance stability, reliability and extensive application of the charging system.

EMBODIMENTS OF THE INVENTION

According to the embodiment of present invention, when new services are added or charging method of original service is changed, there is no need to update or modify charging processing module of the charging system, only the service information provided for the charging system is needed to be properly modified, thus the charging processing module of the charging system is independent of services, so that requirements of existing services and various services in the future can be satisfied by utilizing one set of charging system.

The charging processing module of the charging system provided in the embodiment of the present invention is independent of services, when charging different services with the charging system, different charging rules and other relevant charging information are provided for the charging processing module in terms of different services, services are charged by the charging processing module according to the provided charging rules and other relevant charging information, so as to guarantee the stability of the charging processing module, and achieve the object of charging processing module being independent of services.

By adopting the charging system according to the present invention, overhead cost of human power, material resources and time, which may be caused by updating the charging processing system, can be saved, thus reducing cost of the charging system, moreover, without updating the charging processing module, instable and insecure factors can be decreased.

Embodiments of the present invention will be described in detail hereinafter with reference to the accompanying drawings.

1. The first embodiment for implementing charging method according to the present invention is as follows:

Setting up mapping relation between service attributes and charging rules; wherein, the service attribute is relevant information carried by the to-be-charged service, at least comprising service identifier, service charging type, and other relevant service information.

The service side generates a service identifier for the service to be used by the user according to user's registration, when service corresponding to the service identifier is utilized by the user, such as IP telephone dialing and so on, the service side confirms service attributes of the service according to usage of the user, therein, the service attributes at least comprise service charging attribute, as well as information such as calling number, called number, transfer number, talking duration, service charging type, service identifier, etc.

Other information of the user who is using this service, such as starting time of talking, ending time of talking, etc, when the service used by the user is needed to be charged, the service used by the user becomes the to-be-charged service.

In terms of different to-be-charged services, according to the established mapping relation between service attributes and charging rules, charging rule of each to-be-charged service is confirmed according to the service attribute of each to-be-charged service. Charging rule of each to-be-charged service is provided to the charging processing module, and the charging processing module charges each to-be-charged service according to the provided charging rule of each to-be-charged service and the other information of the user who is using this service, so as to achieve the object that the charging system is independent of service.

Wherein, in the above embodiment, the mapping relation between service attribute and charging rule can be set up in the following way:

Setting up a mapping relation between service identifier, service charging type and field names included in service charging attribute; and setting up a mapping relation between service charging attribute and charging rule;

In this embodiment of the present invention, the mapping relation between service charging attribute and charging rule is recorded in the form of table;

The above-mentioned process as to confirm charging rule for each to-be-charged service in terms of different to-be-charged service is implemented as follows:

When it needs to charge the to-be-charged service, according to the service identifier and service charging type of the to-be-charged service, the field name included in service charging attribute of the to-be-charged service is confirmed according to the mapping relation among the service identifier, service charging type and field names included in service charging attribute;

According to the field name included in service charging attribute of the to-be-charged service, service charging attribute of the to-be-charged service is confirmed through attribute of the to-be-charged service;

According to the service charging attribute of the to-be-charged service, the charging rule of the to-be-charged service is confirmed according to the mapping relation between the service charging attribute and charging rule.

2. The second embodiment for implementing charging method according to the present invention is as follows:

The process in the first embodiment, as to set up the mapping relation among the service identifier, service charging type and field name included in service charging attribute, can be implemented in the second embodiment in the following way:

Setting up a mapping relation among service identifier, service charging type and flag of selective service charging attribute; and setting up a mapping relation between the flag of selective service charging attribute and field name included in service charging attribute.

Wherein, the mapping relation between the flag of selective service charging attribute and field name included in service charging attribute is recorded in the form of table;

In this embodiment of the present invention, when it is requested to charge the to-be-charged service, according to the service identifier and service charging type of to-be-charged service, the flag of selective service charging attribute of the to-be-charged service is confirmed through the mapping relation among the service identifier, service charging type and flag of selective service charging attribute;

According to the flag of selective service charging attribute of the to-be-charged service, through the mapping relation between the flag of selective service charging attribute and field name included in service charging attribute, field name included in service charging attribute of the to-be-charged service is confirmed;

According to the field name included in service charging attribute of the to-be-charged service, service charging attribute of the to-be-charged service is confirmed through attribute of the to-be-charged service;

According to the service charging attribute of the to-be-charged service, the charging rule of the to-be-charged service is confirmed through the mapping relation between the service charging attribute and the charging rule;

The charging rule of the to-be-charged service is provided to the charging processing module, the charging processing module performs a charging process for the to-be-charged service with the provided charging rule, thus the object that the charging system is independent of service is achieved.

3. The third embodiment for implementing charging method according to the present invention is as follows:

In this embodiment, the process in the second embodiment, as to set up the mapping relation among the service identifier, service charging type and flag of selective service charging attribute, can be implemented in the following way:

Setting up a relation between the service identifier and service charging category, and setting up a mapping relation among the service charging category, service charging type and the flag of selective service charging attribute.

Wherein, the mapping relation between the service identifier and service charging category, and the mapping relation among the service charging category, service charging type and flag of selective service charging attribute, is recorded in the form of table, respectively;

The table recording the mapping relation between the service identifier and service charging category comprises the mapping relation among the service identifier, service charging category and discount information; wherein, the discount information comprises periodic discount, quantity discount and other discount-relevant information.

The table recording the mapping relation among the service charging category, service charging type and flag of selective service charging attribute comprises: a mapping relation among the service charging category, service charging type, flag of selective service charging attribute, charging rule, and subordinate charging rule; wherein, the subordinate charging rule comprises minimum session quantity charging policy and session quantity rounding policy, etc.

For illustration convenience, the table recording the mapping relation between the service identifier and service charging category is called table T; the table recording the mapping relation among the service charging category, service charging type and flag of selective service charging attribute is called table A; the table recording the mapping relation between the flag of selective service charging attribute and field name included in service charging attribute is called table S; the table recording the mapping relation between the service charging attribute and charging rule is called table P;

Wherein, the table P is a sub-table of the table S, by analyzing the to-be-included field number of service charging attribute of the current service, sufficient columns are defined in the table S, column number concerning service charging attribute field names in the table S should be larger than the service charging attribute field number of any current service, column number in the table S should also be larger than service charging attribute field number of new services in the future, and column number in the table S should also be larger than the service charging attribute field number of the original service of which the service charging attribute is modified. Column number in the table S is defined in such a way that when more fields are needed to be added to the service charging attribute of the original service, it can be easily fulfilled by searching for the service charging attribute record of the original service in the table S, and adding a column of information in this record; for instance, as for IP telephone calling service, the original service charging attribute is calling number and called number, if it is required to change service charging attribute of IP telephone calling service as calling number, called number and transfer number, it can be fulfilled by just adding a column of transfer number in the original record, without modifying structure of the table S; in this way, when new services are to be developed, it can be fulfilled by just adding a corresponding record in the table S, this record comprises field names included in service charging attribute of the newly developed services, and the value of the flag of selective service charging attribute field of this record is corresponding to that of the relevant record in the table A.

Figure 2:
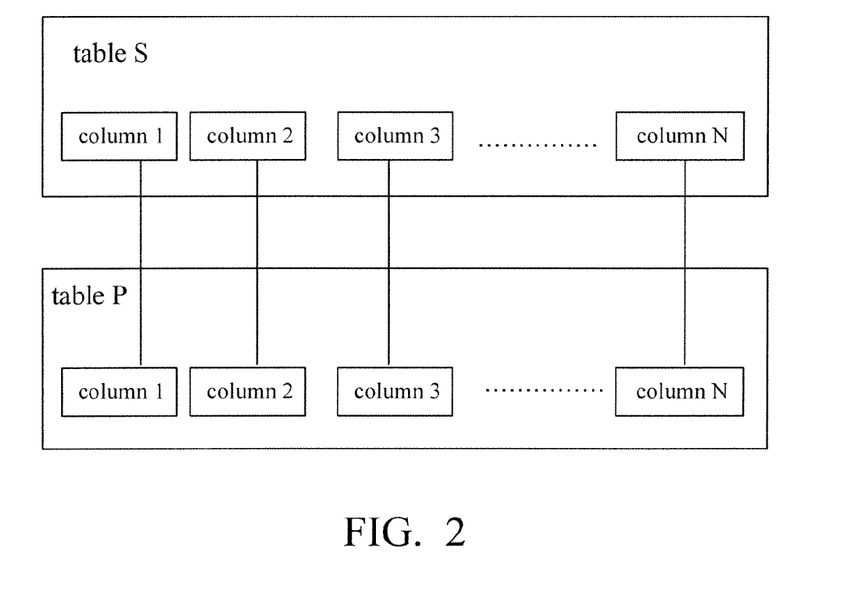
FIG. 2 is a schematic diagram illustrating the corresponding relation between table S and table P according to the embodiment of present invention.

Relevant fields in field names included in service charging attribute in table S is corresponding to relevant fields of service charging attribute in table P, and the corresponding relation thereof is shown in FIG. 2.

When it is required to modify records in the table S or add records in the table S, records in the table P should be adjusted accordingly, the adjusting method is the same as that of adding records in the table S and modifying field number in original record in the table S. If charging rule of a specific service is needed to be modified, it can also be fulfilled by modifying table P accordingly; for example, a service with service charging attribute as calling number and called number has different charging rules corresponding to different calling numbers and called numbers, for example, a combination of calling number 010 and called number 021 is mapped to charging rule IPP_A; a combination of calling number 010 and called number 022 is mapped to charging rule IPP_B; a combination of calling number 021 and called number 0317 is mapped to charging rule IPP_C; charging rule corresponding to the combination of calling number 010 and called number 022 can be modified as IPP_A according to the demand. Similarly, charging rules corresponding to all the combinations of calling number and called number may be modified as IPP_A according to the demand.

In the embodiment of the present invention, service side is responsible for setting up the service usage information table, which is used to record relevant information of user's applied service, and the relevant information at least comprises service charging attribute.

When the original service charging attribute is needed to be modified or the service charging attribute is needed to be added according to the newly developed services, the service usage information table should be adjusted according to the modified or added service charging attribute information.

In the course of setting up service usage information table, different service usage information tables can be set up according to different service charging attribute information, and relevant information of the to-be-charged services with different service charging attributes can be stored in the corresponding service usage information table; it is also applicable to just set up one service usage information table, and the relevant information of the to-be-charged services with different service charging attributes can be stored in the same service usage information table.

In the embodiment of the present invention, it is preferable to set up different service usage information tables according to different service charging attribute information so that the contents of the service usage information table are clear and easy to be managed.

Figure 3:
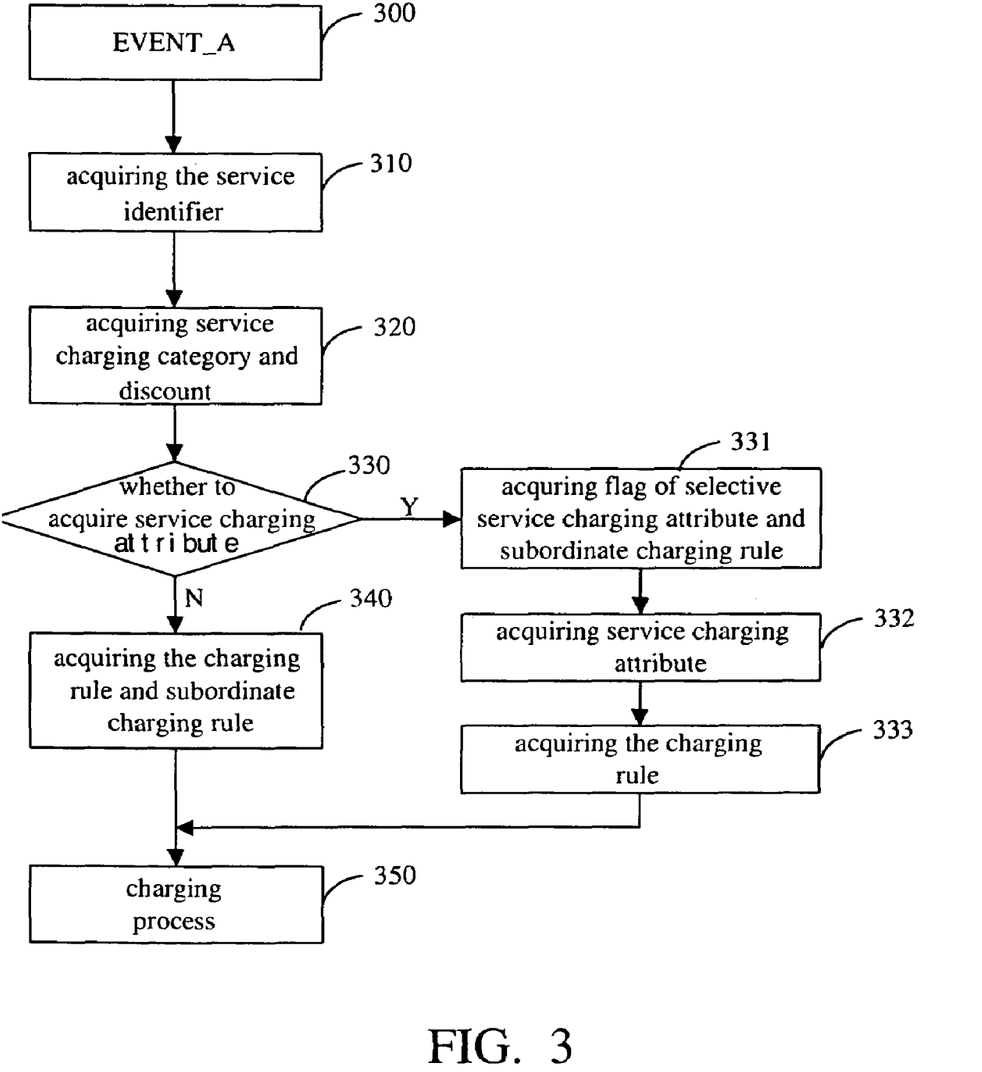
FIG. 3 is a flow diagram illustrating charging process in an embodiment according to the embodiment of present invention.

The third embodiment will be described in detail hereinafter with reference to the accompanying drawing 3.

It is assumed that a user applies for IP telephone service, wherein corresponding service charging categories of this IP telephone service are IP1 and IP2, assuming that the user selects the IP telephone service with service charging category IP1, when the user opens an account, service side generates a user identifier USER_A for the user, and generates a service identifier SERVICE_IP1 for the IP telephone service with service charging category IP1 that USER_A is to employ. The service identifier SERVICE_IP1 is corresponding to the IP telephone service with service charging category IP1 that USER_A applies to employ, and relevant registration information of USER_A is stored in the table T, wherein the table T comprises service identifier SERVICE_IP1, user identifier USER_A, service charging category IP1 and discount information, etc. The discount information comprises periodic discount and quantity discount and other relevant discount information that the user can enjoy.

In step 300, when user USER_A uses the IP telephone service with service charging category IP1, the service side generates a session quantity event according to IP telephone service usage of USER_A; identifier of this event is EVENT_A, and the relevant information of the IP telephone service with service charging category IP1 used by USER_A is recorded in this event; and then, executing step 310;

Wherein, the type of this session quantity event is a service charging type;

Event type of the IP telephone service with service charging category IP1 used by USER_A is session quantity type.

The event comprises information of the IP telephone service with service charging category IP1 used by USER_A, for instance, starting time 2001-01-01 00:00:00, ending time 2001-01-01 01:00:00, user identifier USER_A, service identifier SERVICE_IP1 and table name of service usage information table;

According to requirement of the service usage information table provided in the event, service side writes the relevant service information provided in the event into the service usage information table, such as calling number 010, called number 021, etc.

In step 310, after the service identifier SERVICE_IP1 is acquired from the event, step 320 is executed. According to the service identifier SERVICE_IP1, the discount information and the service charging category IP1, which are corresponding to this service identifier, are acquired from the table T; then, step 330 is executed, namely according to the service charging category IP1 and the session quantity type as event type, judging whether charging rule is comprised in the record corresponding to IP1 and session quantity type by means of searching the record in the table A, if the charging rule is comprised, executing step 340, acquiring the charging rule and subordinate charging rule, and then executing step 350;

In step 330, if the charging rule is not comprised in the record, go to step 331, to acquire the flag of selective service charging attribute and the subordinate charging rule in the record, then go to step 332, according to the acquired the flag of selective service charging attribute, searching for the corresponding record in the table S, acquiring the field name of the service charging attribute in the record, such as calling number and called number. According to the acquired field name of the service charging attribute, searching for the service charging attribute 010 and 021 in the service usage information table provided by the event; then go to step 333, according to the service charging attribute 010 and 021, acquiring the charging rule corresponding to the service charging attribute 010 and 021 from the table P, and then go to step 350;

Wherein, the subordinate charging rule is minimum session quantity charging policy, session quantity rounding policy, etc;

in step 350, according to the relevant information of the to-be-charged service, such as starting time, ending time, discount information and charging rate of the to-be-charged service contained in the subordinate charging rule and the charging rule, the to-be-charged service is charged, thus the object of charging system being independent of services is achieved.

Figure 4:
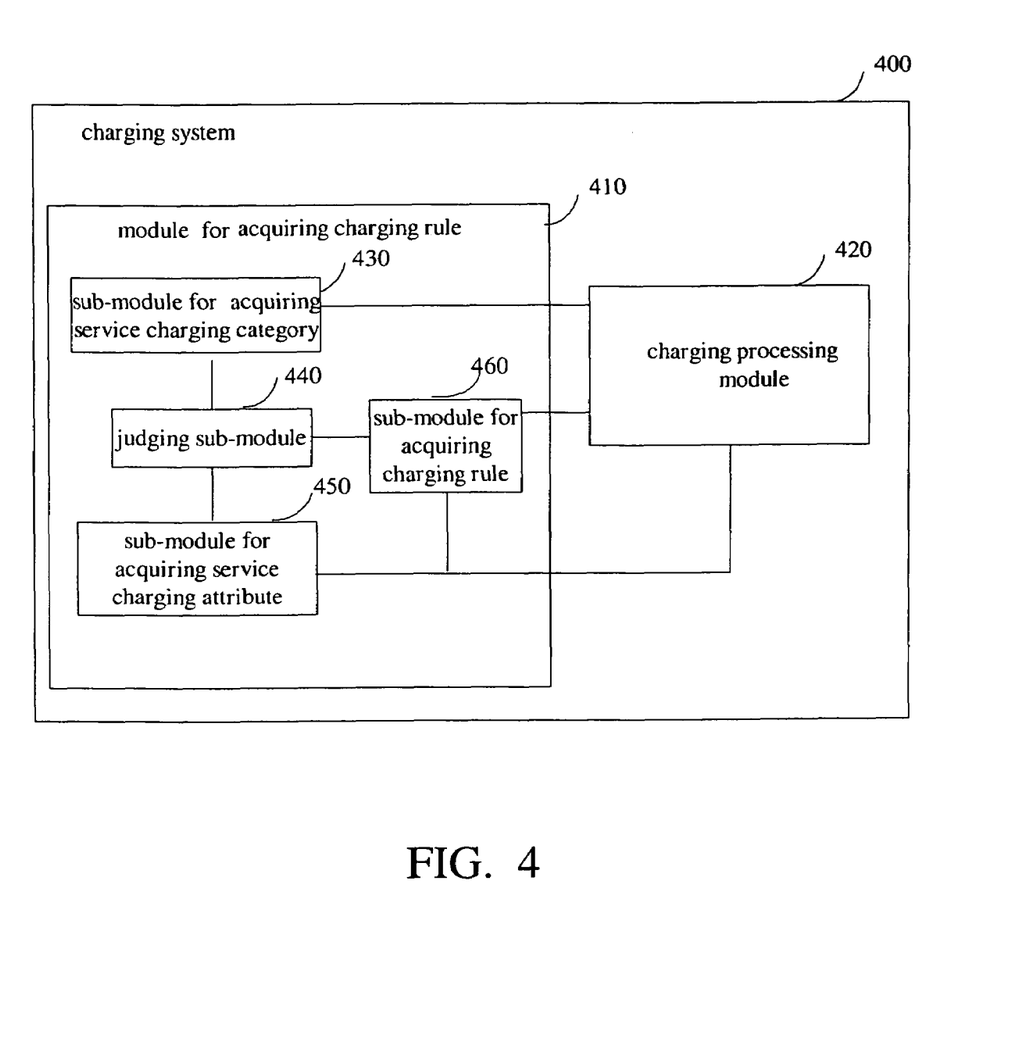
FIG. 4 is a schematic diagram illustrating the charging system according to the embodiment of present invention.

As shown in FIG. 4, a charging system based on the above-mentioned charging method is also provided in the present invention.

In FIG. 4, numeral 400 refers to the charging system provided in the present invention, which comprises a module 410 for acquiring charging rule and a charging processing module 420.

The module 410 for acquiring charging rule, according to the service attribute of the to-be-charged service, acquires the charging rule, discount and subordinate charging rule of the to-be-charged service, and transmits the charging rule, discount and subordinate charging rule of the to-be-charged service to the charging processing module 420.

The charging processing module 420, according to the charging rule, discount and subordinate charging rule of the to-be-charged service transmitted from the module 410 for acquiring charging rule, charges the to-be-charged service.

The module 410 for acquiring charging rule comprises a sub-module 430 for acquiring service charging category, a judging sub-module 440, a sub-module 450 for acquiring service charging attribute and a sub-module 460 for acquiring charging rule.

Wherein, the sub-module 430 for acquiring service charging category, according to the service identifier in the service attribute of the to-be-charged service, acquires the service charging category and discount information corresponding to the to-be-charged service, the acquired discount information is transmitted to the charging processing module 420, and the acquired service charging category is transmitted to the judging sub-module 440.

According to the service charging type carried by the service attribute of the to-be-charged service and the service charging category transmitted from the sub-module 430 for acquiring service charging category, the judging sub-module 440 judges whether the mapping relation among the service charging category, service charging type and flag of selective service charging attribute comprises the charging rule that is corresponding to the service charging type and service charging category of the to-be-charged service, if yes, the identifier for no need to acquire the selective service charging attribute is transmitted to the sub-module 460 for acquiring charging rule. Otherwise, the identifier for needing to acquire the selective service charging attribute is transmitted to the sub-module 450 for acquiring service charging attribute.

When the sub-module 450 for acquiring service charging attribute receives the identifier for needing to acquire the selective service charging attribute transmitted from the judging sub-module 440, through the mapping relation among the service charging category, service charging type and flag of selective service charging attribute, the flag of selective service charging attribute and the subordinate charging rule which are corresponding to the to-be-charged service are acquired. The subordinate charging rule is transmitted to the charging processing module 420. The to-be-included fields of service charging attribute is acquired according to the flag of selective service charging attribute, and the service charging attribute corresponding to the to-be-included fields of service charging attribute is searched in attributes of the to-be-charged service according to-be-included fields of service charging attribute, and is transmitted to the sub-module 460 for acquiring charging rule.

When the sub-module 460 for acquiring charging rule receives the identifier for no need to acquire the selective service charging attribute transmitted from the judging sub-module 440, through the mapping relation among the service charging category, service charging type and flag of selective service charging attribute, the charging rule and the subordinate charging rule which are corresponding to the to-be-charged service are acquired, and are transmitted to the charging processing module 420. When the sub-module 460 for acquiring charging rule receives the service charging attribute transmitted from the sub-module 450 for acquiring service charging attribute, according to the service charging attribute, the sub-module 460 for acquiring charging rule acquires the corresponding charging rule through the mapping relation between the service charging attribute and the charging rule, and transmits this charging rule to the charging processing module 420.

According to the transmitted charging rule, discount information and subordinate charging rule, the charging processing module 420 charges the to-be-charged service.

The above description is just a preferable embodiment of the present invention, not used to limit the present invention, and various changes in form and details may be made therein without departing from the spirit and scope of the invention as defined by the appended claims.

The invention claimed is:

1. A method for realizing charging, comprising:
   a. setting up a mapping relation between a service attribute of a to-be-charged service and a charging rule of the to-be-charged service, wherein said service attribute comprises a service identifier and a service charging type;
   b. acquiring the service attribute of the to-be-charged service when the to-be-charged service is needed to be charged;
   c. acquiring the charging rule of the to-be-charged service through the service attribute of the to-be-charged service, according to the mapping relation between the service attribute and the charging rule; and
   d. charging the to-be-charged service according to the acquired charging rule of the to-be-charged service,
   wherein a comprises,
       a1. setting up a mapping relation among said service identifier, said service charging type and field name included in a service charging attribute, and a2. setting up a mapping relation between said service charging attribute and said charging rule, and wherein c comprises, c1. according to the mapping relation among said service identifier, said service charging type and the field name included in said service charging attribute, the field names included in said service charging attribute of the to-be-charged service being acquired through service identifier and service charging type of the to-be-charged service, c2. confirming said service charging attribute of the to-be-charged service according to the field names included in said service charging attribute of the to-be-charged service, and c3. according to the mapping relation between said service charging attribute and said charging rule, the charging rule of the to-be-charged service being acquired through said service charging attribute of the to-be-charged service.

2. The method according to claim 1, wherein if a1 comprises a11, setting up a mapping relation among said service identifier, said service charging type and a flag of a selective service charging attribute, and a12. setting up a mapping relation between the flag of the selective service charging attribute and said field names included in the service charging attribute, then c comprises:

c4. according to the mapping relation among said service identifier, said service charging type and said flag of said selective service charging attribute acquiring a flag of selective service charging attribute of the to-be-charged service through said service identifier and said service charging type of the to-be-charged service;

c5. according to the flag of said selective service charging attribute of said to-be-charged service, acquiring the field names included in said service charging attribute of said to-be-charged service;

c6. according to the mapping relation between the flag of said selective service charging attribute and the field names included in said service charging attribute, confirming said service charging attribute of said to-be-charged service through the field names included in said service charging attribute of said to-be-charged service; and c7. according to the mapping relation between said service charging attribute and said charging rule, acquiring the charging rule of the to-be-charged service through the service charging attribute of said to-be-charged service.

3. The method according to claim 1, wherein a1 comprises a11. setting up a mapping relation among said service identifier, said service charging type and a flag of a selective service charging attribute, and a12. setting up a mapping relation between the flag of the selective service charging attribute and said field names included in the service charging attribute;

wherein said mapping relation among said service charging category, service charging type and the flag of the selective service charging attribute comprises a mapping relation among said service charging category, service charge type, the flag of the selective service charging attribute, said charging rule and a subordinate charging rule;

wherein said subordinate charging rule comprises a minimum session quantity charging policy and a session quantity rounding policy; and wherein a first table recording the mapping relation between said service charging attribute and said charging rule is a sub-table of a second table recording the mapping relation between said flag of said selective service charging attribute and the field names included in said service charging attribute, and the first and second tables are correlated by a service charging attribute identifier; and fields relating to said service charging attribute in the first table recording the mapping relation between said service charging attribute and said charging rule are corresponding to fields relating to the field names included in said service charging attribute in the second table recording the mapping relation between said flag of said selective service charging attribute and the field names included in said service charging attribute.

4. The method according to claim 3, wherein a field number of said first table recording the mapping relation between said service charging attribute and said charging rule and a field number of the second table recording the mapping relation between said flag of said selective service charging attribute and the field names included in said service charging attribute are larger than that of any service charging attribute, respectively.

5. The method according to claim 3, further comprising:

when further field names included in said service charging attribute need to be added, column information is added to a corresponding record of the first table recording the mapping relation between said service charging attribute and said charging rule, as well as to a corresponding record of the second table recording the mapping relation between said flag of said selective service charging attribute and the field names included in said service charging attribute.

6. The method according to claim 1, wherein if a1 comprises a11. setting up a mapping relation among said service identifier, said service charging type and the flag of the selective service charging attribute, and a12. setting up a mapping relation between the flag of the selective service charging attribute and said field names included in the service charging attribute, and if a11 comprises a111. setting up a mapping relation between said service identifier and a service charging category, and a112. setting up a mapping relation among said service charging category, service charging type and the flag of the selective service charging attribute, then c comprises:

c8. acquiring said service charging category and a discount of said to-be-charged service through the service identifier of said to-be-charged service, according to the mapping relation between said service identifier and said service charging category;

c9. determining whether the service charging attribute needs to be acquired by judging whether the mapping relation among said service charging category, said service charging type and said flag of said selective service charging attribute comprises the charging rule corresponding to said service charging category and said service charging type of the to-be-charged service, and, if yes, executing step c91, otherwise executing c95;

c91. according to the mapping relation among said service charging category, said service charging type and said flag of said selective service charging attribute, acquiring the flag of said selective service charging attribute and a subordinate charging rule that corresponds to said service charging category and said service charging type;

c92. according to the flag of said selective service charging attribute of the to-be-charged service, acquiring the field name of said service charging attribute of said to-be-charged service;

c93. according to the field names of said service charging attribute of the to-be-charged service, acquiring the service charging attribute of the to-be-charged service;

c94. according to said service charging attribute of the to-be-charged service, acquiring the charging rule of the to-be-charged service; and c95. acquiring the charging rule and said subordinate charging rule that corresponds to the service charging category and said service charging type.

7. The method according to claim 6, wherein d comprises:

charging the to-be-charged service according to the charging rule, discount information and said subordinate charging rule.

8. The method according to claim 6, wherein said mapping relation between the service charging identifier and the service charging category comprises a mapping relation among said service identifier, service charging category and discount information, wherein the discount information comprises information of periodic discount and quantity discount.

9. The method according to claim 8, wherein said mapping relation among said service charging category, said service charging type and said flag of said selective service charging attribute comprises a mapping relation among said service charging category, said service charge type, said flag of said selective service charging attribute, said charging rule and a subordinate charging rule;

wherein said subordinate charging rule comprises a minimum session quantity charging policy and a session quantity rounding policy.

10. The method according to claim 6, wherein said mapping relation among said service charging category, said service charging type and said flag of said selective service charging attribute comprises a mapping relation among said service charging category, said service charging type, said flag of said selective service charging attribute, said charging rule and said subordinate charging rule, wherein said subordinate charging rule comprises a minimum session quantity charging policy and a session quantity rounding policy.

11. A charging system comprising:

a module for acquiring a charging rule and a charging processing module, wherein the module for acquiring said charging rule acquires the charging rule corresponding to a to-be-charged service according to a service attribute of the to-be-charged service, and transmits the charging rule to the charging processing module;

wherein the charging processing module charges the to-be-charged service according to the transmitted charging rule;

wherein the module for acquiring charging rule comprises, a sub-module for acquiring service charging category, a judging sub-module, a sub-module for acquiring service charging attribute, and a sub-module for acquiring a service charging rule, wherein, the sub-module for acquiring service charging category is used to acquire the discount and service charging category which are corresponding to the to-be-charged service according to service identifier of the service attribute of the to-be-charged service, and outputs the discount to the charging processing module, and outputs the service charging category to the judging sub-module, according to the received service charging category, the judging sub-module determines whether a service charging attribute is needed to be acquired by judging whether the mapping relation among said service charging category, service charging type and the flag of the selective service charging attribute comprises the charging rule that is corresponding to the to-be-charged service; if no, the judging sub-module notifies the sub-module for acquiring the service charging rule not to acquire the service charging attribute of the to-be-charged service; if yes, the judging sub-module notifies the sub-module for acquiring the service charging attribute to acquire the service charging attribute of the to-be-charged service;

when the sub-module for acquiring the service charging attribute receives the notification of acquiring the service charging attribute of the to-be-charged service, according to the mapping relation among the service charging category, service charging type and the flag of the selective service charging attribute, it acquires the flag of the selective service charging attribute and the subordinate charging rule which are corresponding to the to-be-charged service; the sub-module for acquiring service charging attribute acquires the field name included in the service charging attribute according to the flag of the selective service charging attribute, and acquires the service charging attribute according to the field name included in the service charging attribute, and transmits the subordinate charging rule to the charging processing module; transmitting service charging attribute to acquiring service charging rule sub-module;

when the sub-module for acquiring the service charging rule receives the notification of not acquiring the service charging attribute of the to-be-charged service, according to the mapping relation among the charging category, the service charging type and the flag of the selective service charging attribute, it acquires the charging rule corresponding to the to-be-charged service and transmits the acquired charging rule to the charging processing module; when the sub-module for acquiring service charging rule receives the service charging attribute, it acquires the charging rule from the mapping relation between the service charging attribute and the charging rule, and transmits the acquired charging rule to the charging processing module.

* * * * *